UNITED STATES PATENT OFFICE.

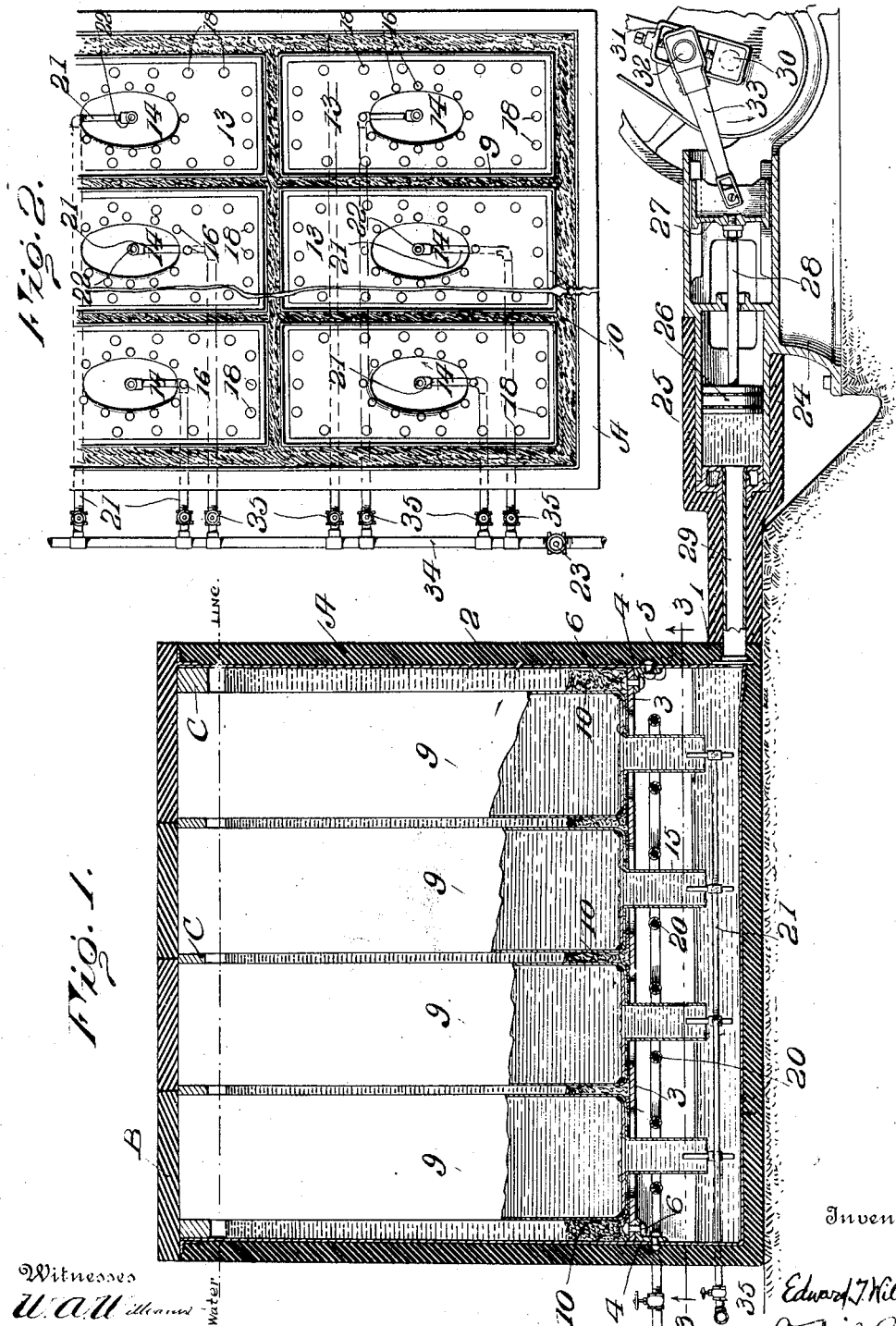

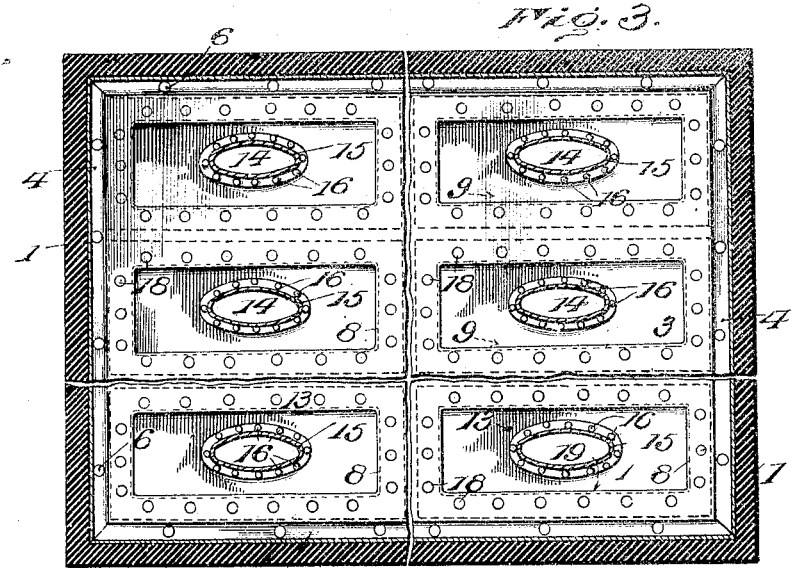
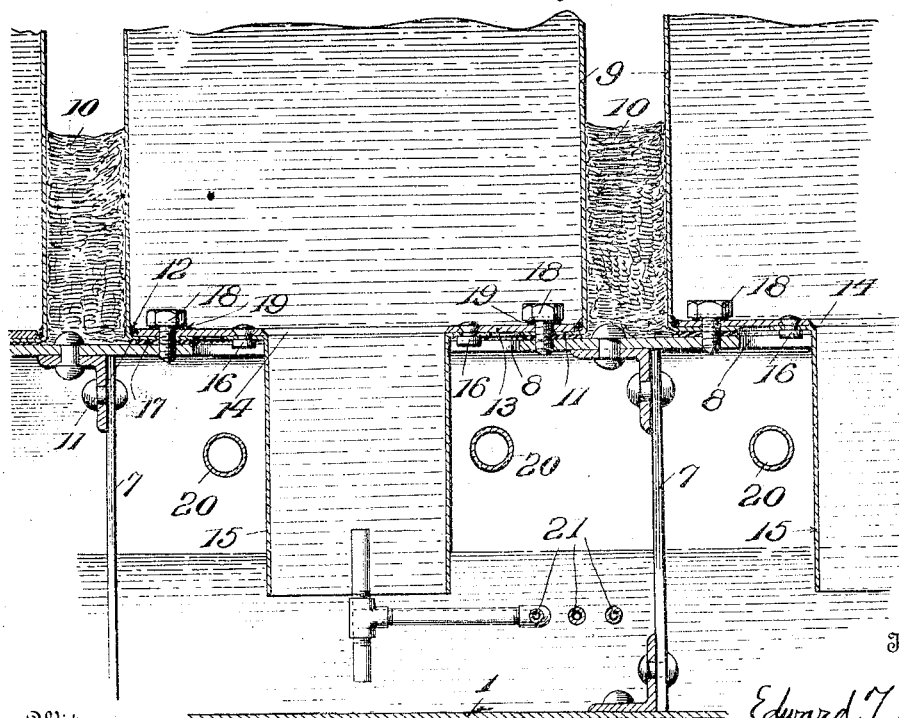

EDWARD T. WILLIAMS, OF BROOKLYN, NEW YORK.

APPARATUS FOR MAKING ICE.

1,178,116.   Specification of Letters Patent.   Patented Apr. 4, 1916.

Application filed January 22, 1914. Serial No. 813,719.

*To all whom it may concern:*

Be it known that I, EDWARD T. WILLIAMS, a citizen of the United States of America, and a resident of Brooklyn, in the county of Kings and State of New York, have invented certain new and useful Improvements in Apparatus for Making Ice, of which the following is a specification.

My invention relates to apparatus for making ice and to a method of ice making and may be regarded in some aspects as being an improvement on the apparatus of prior patents of mine and more particularly of Patents Nos. 1,051,298 and 1,051,299, patented January 21, 1913. As in the apparatus of the patents, I employ a shallow water tank on the top of which molds are located, these molds being in communication through holes in their bottoms with the water in the tank, and I employ means for freezing and thawing the water in the molds.

While some features of my invention are applicable to jacketed molds, I have effected a cheaper and more practicable construction by locating the molds in a brine tank placed above the water tank, the bottom of this brine tank being constituted by the support for the molds and the brine being circulated in the spaces between the molds. I so construct the molds and the water tank as to provide an air space between the top of the water tank and the level of the water in said tank, the air trapped therein serving as a most effective insulating means to prevent freezing of the water in the depending shells of the molds and in the tank itself. This space I also utilize in harvesting. It is simplest to make this space common to all the molds but obviously the space may be sub-divided to any desired extent or the molds themselves might be provided with individual air spaces below their bottoms. In addition to employing agitating air as heretofore, I provide an auxiliary agitator which I have illustrated as a reciprocating pump, the purpose of which will be more clearly apparent from the following description of the method.

In practising my invention I confine water and freeze it from a plurality of points until the ice masses thus formed almost meet, and then institute the step of causing the water to surge in alternate directions through the space or spaces between said masses, and continue this action while the freezing proceeds until the cake is complete. These masses may form as a continuous wall or coating—as where the freezing is from the sides of a mold—or they may be entirely separate until the freezing operation is almost complete, where the points from which the freezing takes place are separated. It is to be understood that this method is also applicable where a block of ice is formed from opposite plates, or where internal freezing zones are employed in a mold. It is noted that there may be several holes through the bottom of a given mold with an air supply to each. I bring about this surging action by putting into operation at the time indicated the auxiliary agitator above referred to. From the beginning of the freezing operation until it is almost completed I customarily agitate the water in the molds by means other than the agitator, and preferably, as heretofore, by introducing air under pressure at their bottoms. I then stop the preliminary agitation and start the auxiliary agitator thus causing the water to surge as above explained. The air supply is cut off and the auxiliary agitator started shortly before the completion of the cake. This insures better ice since where the air is left on until the ice masses are frozen together the water below the point at which they freeze together will all be displaced with the air thus leaving a void in the cake. Or, in the event of it being frozen at the bottom first, the water would form opaque ice containing impurities which could not escape. The use of the auxiliary agitator adds little to the cost, since in view of the fact that the cakes are nearly finished when it is brought into use, it needs but a slight displacement and is operated only for a short time. While the speed of the auxiliary agitator may be varied within reasonable limits to suit conditions an appropriate speed for the agitator would be about 20 R. P. M.

The above discussion of the apparatus and method of using it are designed to give a general view of the nature of my invention rather than to detail all its novel features; reference should accordingly be had to the claims appended hereto which more fully set forth the invention and define its scope.

Referring to the drawings: Figure 1 is a vertical section of the apparatus; Fig. 2 is a plan view of a group of the molds; Fig. 3 is a horizontal section on the line 3—3, Fig. 1, looking in the direction of the arrows, and Fig. 4 is an enlarged incomplete view showing in vertical section details of mold construction, etc.

I have omitted from the drawings much that is common in the art and seems to require no illustration, the means for cooling and heating the brine and for serving the same, for example. Obviously the brine could be circulated through an outside brine cooler or be cooled by pipes immersed in the brine tank for this purpose. For thawing, the brine might be given the requisite heat by being circulated through the cooling coil of the fore-cooler, these being well known expedients in the art and requiring no illustration. Although in the specification and claims I use the terms brine and brine tank I do this merely for convenience and may of course employ any suitable refrigerant.

The water tank is designated by the numeral 1 and occupies the bottom of a casing, the upper part of which constitutes the brine tank 2. Above the level of the water in the tank 1 is located the support or frame work 3 which may itself be supported in any suitable way as by brackets or angles 4 riveted to the casing as indicated at 5 and to the frame work as indicated at 6, and also by braces 7 in any suitable number and arrangement and secured in any suitable way as by brackets or angles and riveting as just described. This frame work is provided with rows of spaced holes 8 and mounted on the frame work adjacent each of these holes is a mold 9, the relative dimensions of the molds and frame work being such as to leave spaces between the walls of adjacent molds for refrigerant, the frame work thus constituting not only the support on which the molds rest but also the bottom of the brine tank and part of the top of the water tank. The tanks are insulated in any suitable manner as by insulation A, and an individual insulating cover B is provided for each mold. Spacers C which may be of wood are located between the molds and between the molds and the walls of the brine tank.

The joints between the molds and the support 3 must obviously be such as not to permit any brine to pass through into the water tank and no air into the brine tank and while this result will be secured if the joints are carefully made, I prefer to provide seals 10 of fluid-proof compound. A convenient construction and the one illustrated shows the molds made in several pieces and with their upright walls inturned at the bottom to form a horizontal flange 11 to which is secured, preferably by solder 12, the bottom 13 having a hole or holes 14 each of which is surrounded by a shell 15 which may be integral with the bottom but as shown is secured thereto by rivets 16. To make a tight joint I prefer to rest the mold on a gasket 17 adjacent the edge of the hole 8. In the construction illustrated, the inturned flange rests on said gasket and bolts 18 having at the under sides of their heads another gasket 19 are passed through the mold bottom 13 and the gasket 17 and are screw-threaded through the support or frame work 3, these bolts being provided in sufficient numbers a very tight joint may be secured by screwing them down close. It will be noted that the bottoms 13 of the molds form part of the top of the water tank, of which the support 3 also forms a part in addition to forming the bottom of the brine tank. The pipes or shells 15 extend below the top of the water tank into the tank and into the water therein. These pipes or shells with the walls and top of the water tank constitute air trapping means and provide an air space beneath the top of the water tank and between it and the level at which the water stands in the said tank. Such space forms a most effective insulation. It may be common to all the molds extending unbroken beneath the entire top of the water tank, or, as has been suggested above, it may be sub-divided to any desired extent. For instance, the braces 7 might be used for this purpose openings being left in them below the level at which it was desired to have the water stand or individual molds might be provided with individual air pockets. This space is traversed by thawing pipes 20 through which warm brine or steam may be circulated the heat being conveyed to the mold bottoms by radiation, or hot air may be used if desired. Agitating air pipes 21 are provided for introducing air into the bottoms of the molds through the open-ended pipes or nozzles 22, the pipes 21 being safe-guarded against freezing by their location in the water tank. A suitable air cut-off 23 is provided for the air header 34 and also individual cut-offs 25.

The agitator has a base 24, cylinder 25, and related parts, in which are mounted the plunger 26, cross-head 27 and rod 28 connecting them. The end of the cylinder 25 has a connection 29 with the water tank. The cross-head is power driven by shaft 30, crank 31 having an adjustable wrist pin 32 and pitman 33 connected to the cross head 27, this arrangement permitting the stroke of the agitator to be varied. The connection 29 may be provided with suitable insulation.

Another advantage of the air space provided by my construction is that, where an agitator is employed therewith, the air in the said space provides a cushion for the surging action caused by the agitator which tends to produce violent action just before and after the ice cakes become frozen solid, such violent action being prevented by the cushioning effect of the air. This would be true even if the air supply were dispensed with.

In describing and claiming the agitator as "in communication with" the water tank, I have of course not meant to imply that it may not be placed in the tank instead of outside it. The molds may be supplied with water in any convenient way.

What I claim as my invention is:

1. Ice making apparatus comprising in combination, a water tank having a top provided with spaced holes, gaskets adjacent said holes, and molds corresponding in number and location to said holes and having at their bottoms inwardly extending flanges resting on said respective gaskets, and bottoms resting on said flanges and secured with said flanges to the top of the water tank, said bottoms having pipes depending through said holes to place the molds in communication with the water tank.

2. Ice making apparatus comprising in combination, a water tank, a plurality of molds in communication therewith, freezing means for said molds, means for agitating the water in said molds, and an auxiliary agitator in communication with said tank to cause the water in said molds to surge back and forth after the first named agitating means ceases to operate when the ice cake is nearing completion.

3. Ice making apparatus comprising in combination, a water tank, a plurality of molds in communication therewith, freezing means for said molds, means for supplying agitating air to the interior of said molds, a cut-off for said air supply, and an agitator in communication with said water tank to cause the water in said molds to surge back and forth.

4. Ice making apparatus comprising in combination, a water tank, a plurality of molds in communication therewith, freezing means for said molds, means for supplying air under pressure to the interior of individual molds, individual air cut-offs to control the supply of air to individual molds, and an agitator in communication with said water tank.

5. Ice making apparatus comprising in combination, a water tank having a top, a plurality of molds located on said top and in communication at their bottoms with said tank, freezing means for said molds, means for supplying agitating air to said molds at their bottoms, a cut-off for said air supply, and a reciprocating plunger to cause the water in said molds to surge back and forth in said molds after the agitating air is shut off when the ice cake is nearing completion.

6. Ice making apparatus comprising in combination, a water tank, a mold having a hole in its bottom whereby it is in communication with said water tank, means for trapping air beneath said mold bottom, means for supplying air under pressure to the interior of said mold, and an agitator associated with said tank to impart movement to the water therein.

7. Ice making apparatus comprising in combination, a water tank, a mold having a hole in its bottom whereby it is in communication with said water tank, means for trapping air beneath said mold bottom, and a mechanical agitator in communication with said water tank to cause the water in the mold to surge back and forth.

8. Ice making apparatus comprising in combination, a water tank, a mold having a transverse bottom provided with a hole whereby it is in communication with said water tank, and having a pipe or shell surrounding said hole and extending down from said bottom into the tank, walls constituting with said depending pipe or shell means for trapping air beneath said mold bottom, and a mechanical agitator in communication with said water tank to cause the water in the mold to surge back and forth.

9. Ice making apparatus comprising in combination, a water tank, a plurality of molds in communication therewith, means for trapping air between the bottoms of the molds and the water in the tank, freezing means for said molds, means for supplying air under pressure to the interiors of said molds, and an agitator in communication with said water tank to cause the water in said molds to surge back and forth.

10. Ice making apparatus comprising in combination, a water tank having a top, a plurality of molds located on said top and having bottoms provided with holes whereby they are in communication with said tank and having pipes or shells extending below the top of the tank into said tank whereby air is trapped between the water in the tank and the top of the tank, means for supplying air under pressure to said molds, and an agitator in communication with said water tank to cause the water in said molds to surge back and forth.

11. Ice making apparatus comprising in combination, a water tank having a top, a plurality of molds located on said top and having bottoms provided with holes whereby they are in communication with said tank and having pipes or shells extending below the top of the tank into said tank whereby air is trapped between the water in the tank and the top of the tank, means for supplying air under pressure to said molds, and a reciprocating plunger to cause the water in said molds to surge back and forth.

12. Ice making apparatus comprising in combination, a water tank, molds located above the tank and in communication therewith, means whereby said molds are provided with a common air space between their bottoms and the water in the tank, and a mechanical agitator in communication with said water tank.

13. Ice making apparatus comprising in combination, a water tank, molds located above the tank and in communication therewith, means whereby said molds are provided with a common air space between their bottoms and the water in the tank, means for supplying agitating air to the interiors of the molds, and a mechanical agitator in communication with said water tank.

14. Ice making apparatus comprising in combination, a water tank, a support having spaced openings therein and located above the level of the water in said tank, upright molds on said support having a liquid-tight connection therewith, said molds corresponding in number and location to the openings in said support and having bottoms provided with holes and pipes or shells surrounding said holes and extending below said support into the water tank thus providing a common space beneath the bottoms of the molds in which air is trapped, and a mechanical agitator in communication with said water tank.

In testimony whereof I affix my signature in presence of two witnesses.

EDWARD T. WILLIAMS.

Witnesses:
JOHN L. FLETCHER,
H. S. IMIRIE.